(12) United States Patent
Schmidt (10) Patent No.: US 7,172,370 B2
(45) Date of Patent: Feb. 6, 2007

(54) CUTTING SYSTEM, DEVICE, AND METHOD FOR SPLITTING PIPES

(75) Inventor: Wolfgang Schmidt, Kirchundem (DE)

(73) Assignee: Tracto-Technik GmbH, Lennestadt (DE)

( * ) Notice: Subject to any disclaimer, the term of this patent is extended or adjusted under 35 U.S.C. 154(b) by 0 days.

(21) Appl. No.: 11/003,505

(22) Filed: Dec. 6, 2004

(65) Prior Publication Data

US 2005/0138815 A1 Jun. 30, 2005

(30) Foreign Application Priority Data

Dec. 4, 2003 (DE) ................. 103 57 061

(51) Int. Cl.
*F16L 55/18* (2006.01)

(52) U.S. Cl. ................. 405/184.3; 405/156

(58) Field of Classification Search ............... 405/156, 405/184.3; 138/97, 98; 30/92.5, 90.4, 90.8, 30/90.9; 166/55.2, 55.3, 55.7, 361
See application file for complete search history.

(56) References Cited

U.S. PATENT DOCUMENTS

| | | | | |
|---|---|---|---|---|
| 1,710,580 A | * | 4/1929 | Le Bus | ........................ 175/272 |
| 2,983,042 A | * | 5/1961 | Frantz et al. | ................. 30/92.5 |
| 3,462,052 A | * | 8/1969 | Wagner | ....................... 30/90.4 |
| 4,903,406 A | * | 2/1990 | Schosek et al. | ............... 30/92.5 |
| 4,983,071 A | * | 1/1991 | Fisk et al. | .................. 166/55.2 |
| 5,078,546 A | * | 1/1992 | Fisk et al. | ................... 405/156 |
| 5,098,225 A | * | 3/1992 | Rockower et al. | .......... 405/156 |
| 5,171,106 A | | 12/1992 | Rockower et al. | |
| 5,445,222 A | * | 8/1995 | Pritchard et al. | ........... 166/55.1 |
| 6,340,270 B2 | * | 1/2002 | Puttmann | .................. 405/184.3 |
| 2001/0018007 A1 | | 8/2001 | Puttmann | |
| 2003/0084764 A1 | | 5/2003 | Wentworth | |

FOREIGN PATENT DOCUMENTS

| | | | |
|---|---|---|---|
| DE | 198 31 190 C1 | | 10/1999 |
| DE | 200 00 153 U 1 | | 6/2000 |
| WO | 9304312 | * | 3/1993 |
| WO | WO02/29304 A1 | | 4/2002 |
| WO | WO/02/076691 A2 | | 10/2002 |

* cited by examiner

*Primary Examiner*—Frederick L. Lagman
*Assistant Examiner*—Jong-Suk (James) Lee
(74) *Attorney, Agent, or Firm*—Finnegan Henderson Farabow Garrett & Dunner LLP (57) ABSTRACT

A cutting system for splitting pipes includes a main body and at least one blade and at least two blade mount assemblies by which the blade may optionally be connected to the main body. The first blade mount assembly, in a particular fitted state, holds the blade at a different distance from the longitudinal axis of the main body than the second blade mount assembly.

44 Claims, 12 Drawing Sheets

CUTTING SYSTEM, DEVICE, AND METHOD FOR SPLITTING PIPES

FIELD OF THE INVENTION

The invention relates to a cutting system and a device and a method for splitting pipes.

BACKGROUND OF THE INVENTION

In order to replace old lines, it is known to destroy them from the inside. Older pipers are typically cut or broken up prior to being replaced with newer pipes, and the new pipe is inserted into the broken older pipe. For example, in the "burst lining method", the old pipe is broken up or taken apart with the aid of a bursting or cutting tool and forced into the ground at the side. For this purpose, a bursting or cutting head is moved through the old pipe route with the aid of a pulling or pushing apparatus and the pipe casing is pressed into the ground surrounding the pipe with the aid of a following expanding head A device of this type is disclosed, for example, in WO 02/076691 A2. A disadvantage of the device described therein is that the device can only ever be effectively used for a narrow diameter range of the pipes which are to be split. To split pipes outside this narrow diameter range, a new device specially adapted to this diameter range has to be produced.

WO 02129304 A1 discloses a device for splitting pipes from the inside, in which a cutting element is mounted in a radially movable manner with respect to the longitudinal axis of a main body and a mimic is provided for diverting pulling or pushing forces acting on the device into a radial movement of the cutting element. The radially movable cutting element permits conventional ductile cast iron pipes, and other pipes which can be difficult to destroy, to be taken apart with low pulling forces without problems occurring even at brackets, sockets or repair points which have a thickening of the material. By the pulling or pushing force acting on the tool being deflected into a radial movement of the cutting element, as the pulling or pushing load increases, for example during cutting of a socket, the cutting element is deflected radially. As a result, even pipe sections of this type can readily be severed. This device also has a defined diameter range of pipes which can be split up, in which it can be used. Pipes having a larger diameter cannot be split up by this device.

Against this background, the object of the present invention is a device and a cutting system and a method for splitting up pipes which enable pipes over a greater diameter range to be split.

SUMMARY OF THE INVENTION

The present invention includes a system configured to cut a pipe, the system comprising a main body having a longitudinal axis; a blade; and first and second blade mount assemblies having an upper surface and a lower surface. The first and second blade mount assemblies may be selectively attached to the main body, the first blade mount assembly being configured to selectively secure the blade at a first distance from the longitudinal axis of the main body. The second blade mount assembly may be configured to selectively secure the blade at a second distance from the longitudinal axis of the main body, the first distance being different from the second distance.

Consistent with an additional aspect of the present invention a first blade and a second blade are provided. The first blade is of a different size than the second blade. The blade mount assembly may be configured to selectively secure at least one of the first and second blades.

Another aspect of the present invention may also include the blade mount assembly being selectively secured to the main body at one of a first or second connection points, the second connection point being offset radially from the first connection point in a direction away from the longitudinal axis of the main body.

Consistent with an additional aspect of the present invention, a main holder may be rigidly secured to the main body. The main holder may be configured to selectively secure at least one blade to the main body. The main body may include a plurality of connection points for selectively securing the blade to the main body. A first connection point may be offset radially from a second connection point in a direction away from the longitudinal axis of the main body. The plurality of connection points allow the blade to mounted such the distance between the longitudinal axis of the main body and the tip of the blade may be varied.

Another aspect of the present invention includes a method of splitting a pipe, the method comprising selectively securing the blade to the blade mount assembly; selectively securing the support body to the support assembly; selectively securing the support assembly to the main body at a first position such that the support assembly is opposite the blade mount assembly with respect to the longitudinal axis of the main body; selectively securing the blade mount assembly to the main body at a first position such that a cutting point of the blade is at a greater distance from an opposite support body than the inside diameter of the pipe; and applying sufficient pressure to the main body in a longitudinal direction to split the pipe.

DESCRIPTION OF THE EMBODIMENTS

The invention is based, inter alia, on the concept of providing, within the scope of a cutting system, blade mount assemblies with which blades may be selectively secured to the main body via the main holder. As a result, for each blade mount assembly, the blade is held at a different distance from the longitudinal axis of the main body. A simple change of the blade mount assembly enables the device, which is assembled from the main body and blade mount assembly and is intended for splitting pipes, to be adapted in a simple manner to the particular pipe diameter. In the case of small pipe diameters, a blade mount assembly may be selected which holds the blade appropriately close to the longitudinal axis of the main body and, in the case of large pipe diameters, a blade mount assembly may be selected which holds the blade appropriately further from the longitudinal axis of the main body. Alternatively, the blades may be mounted directly on the main holder of the main body.

The simple construction consistent with an aspect of the present invention further provides the advantage of adaptability. The cutting system can be composed of system components which may be produced in a simple manner, and the system components may be easily interchanged. A complex construction of a device with a blade held movably for adjustment purposes is avoided.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

Reference will now be made in detail to the present exemplary embodiments of the invention, examples of which are illustrated in the accompanying drawings. Wherever possible, the same reference numbers will be used throughout the drawings to refer to the same or like parts.

Figure 1:
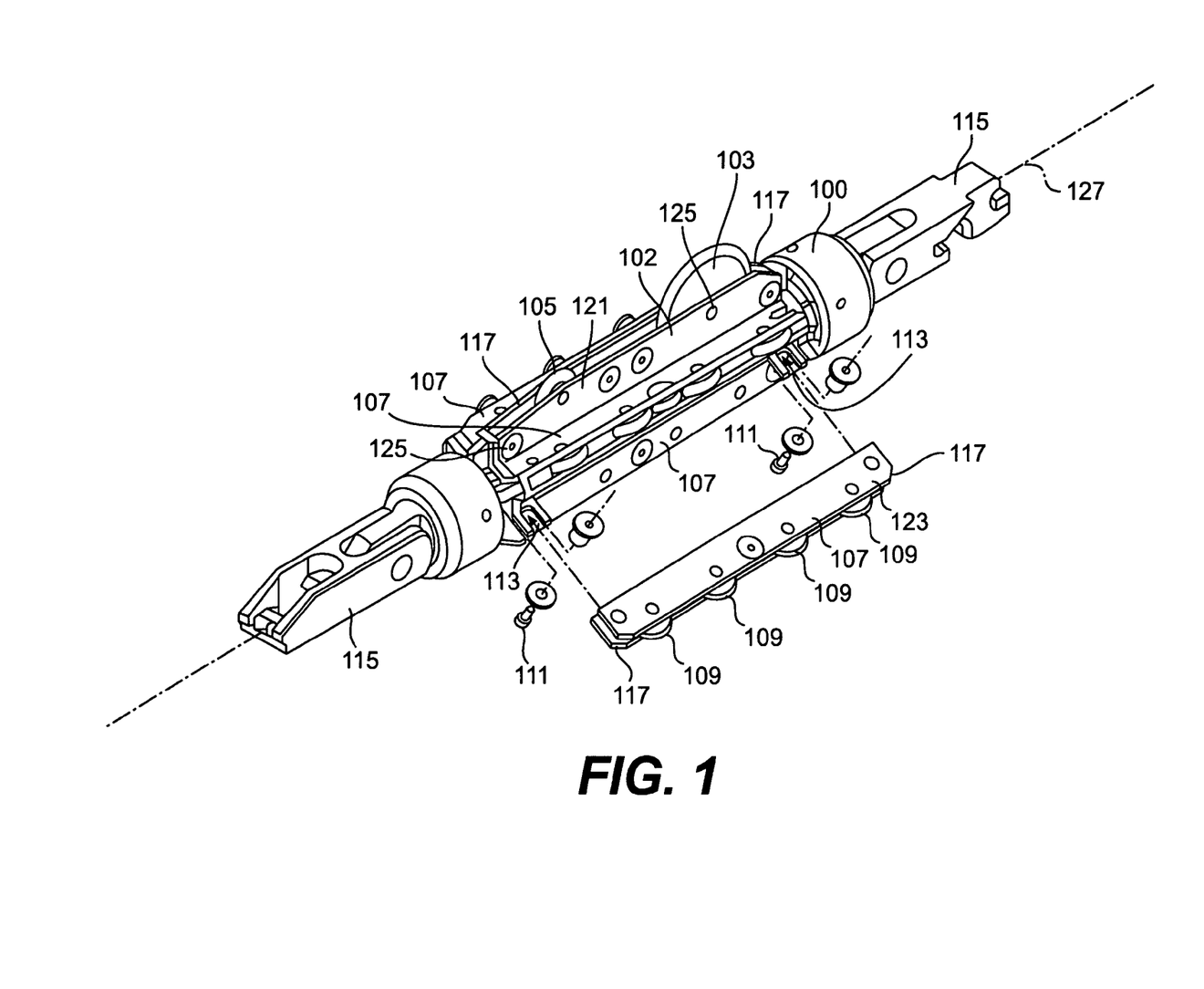
FIG. 1 shows, in a perspective view, a main body and a blade mount assembly of the system according to the invention.
Figure 12:
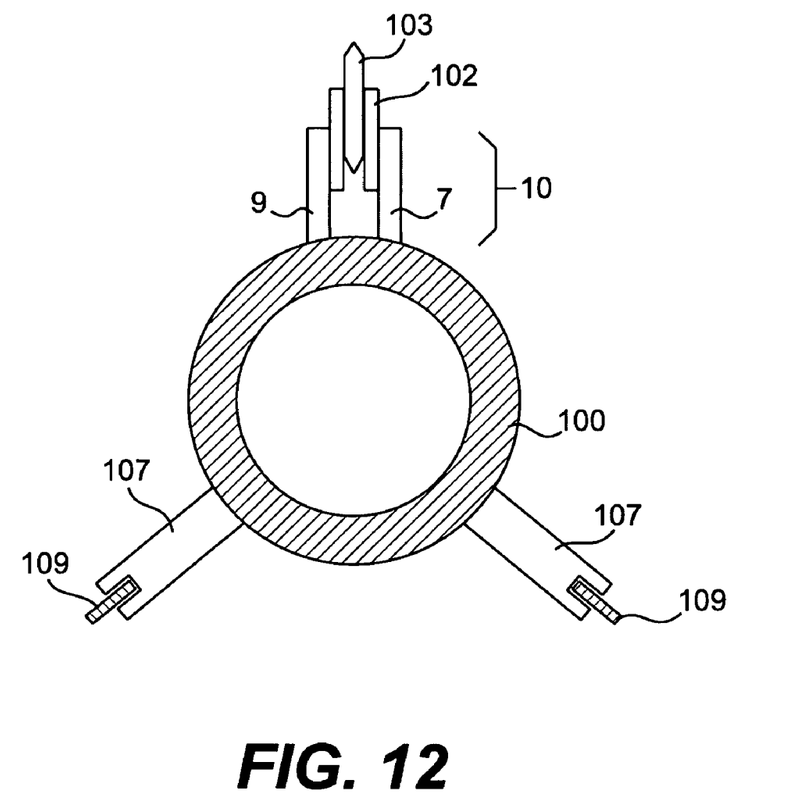
FIG. 12 shows, in a cross-sectional view, the main body and a securely attached support assembly.

FIG. 1 shows a main body 100, a blade mount assembly 102, and two blades 103, 105 which are held in the blade mount assembly 102. Support assemblies 107, each having four supporting bodies 109, are selectively secured on the main body 100 via main body flanges 113 via support assembly connecting bolts 111. Blade mount assembly 102 is also selectively secured to main body 100 via main body flanges 113 via blade mount connection bolts 125. In another construction depicted in FIG. 4, blade mount assembly 102 and support assemblies 107 may be secured to main holder 10. In a further alternate embodiment depicted in FIG. 12, support assemblies 107 may be rigidly and permanently secured to main body 100. The supporting bodies 109 and the blades 103, 105 may be held rotatably in blade mount assembly 102 and support assembly 107, respectively.

The main body 100 has connecting elements 115 for connection to a drilling linkage (not illustrated).

The blade mount assembly 102 and the support assembly 107 are formed from elongated plates 121, 123. The plates 121, 123 may include a sloped upper surface 117 at the longitudinal end of each plate 121, 123.

Figure 2:
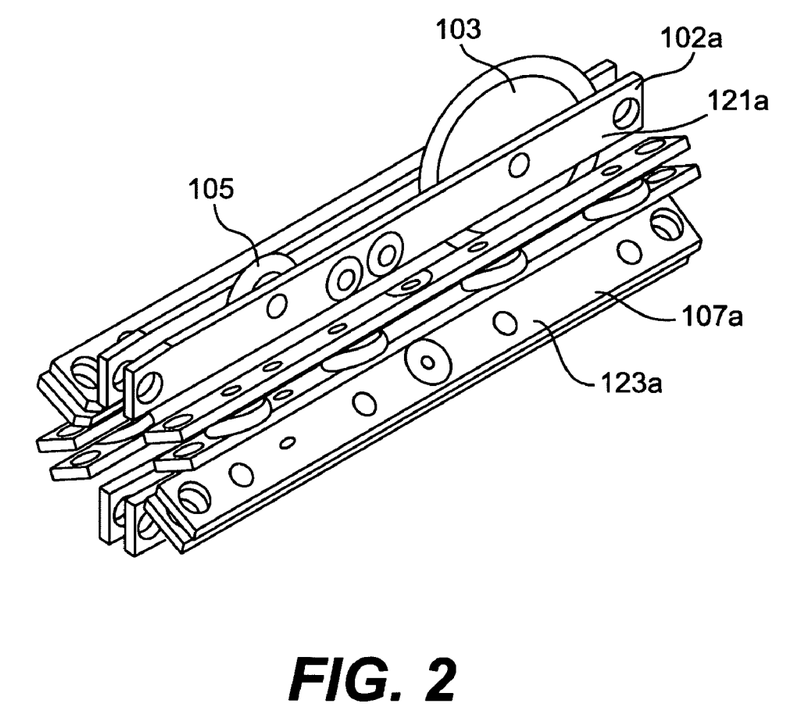
FIG. 2 shows, in a perspective view, a further blade mount assembly of the system according to the invention.
Figure 3:
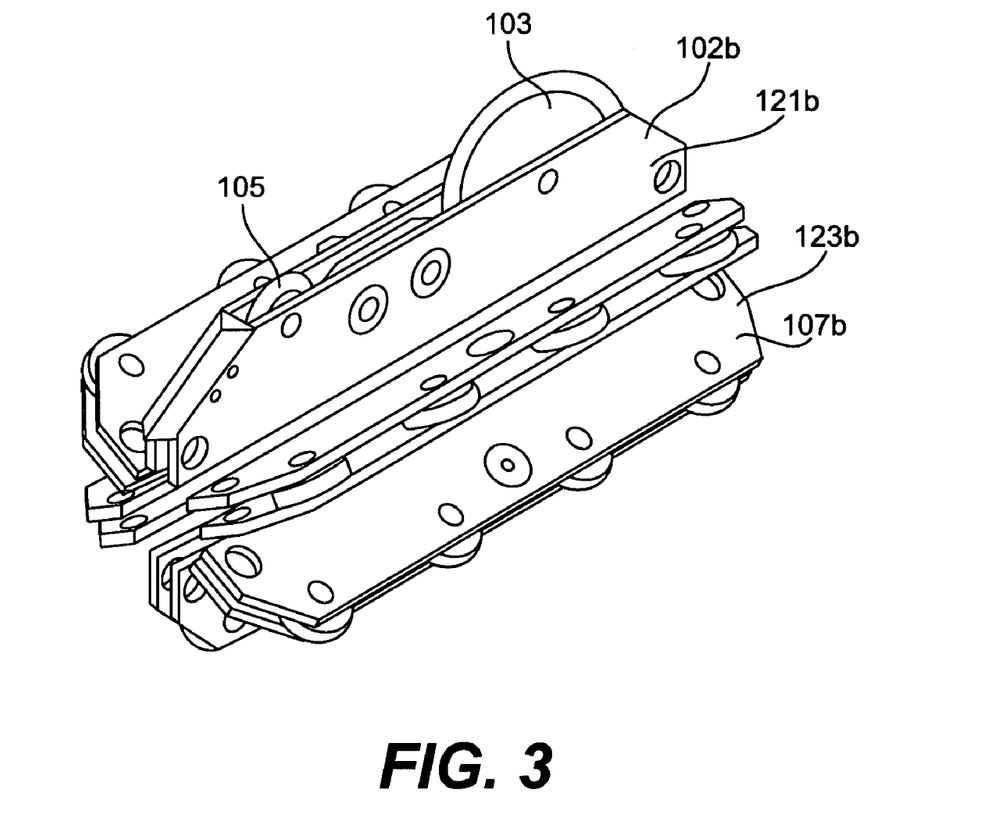
FIG. 3 shows, in a perspective view, a third Made mount assembly of the system according to the invention.

FIGS. 2 and 3 illustrate further blade mount assemblies 102a, 102b and support assemblies 107a, 107b. Plates 121a of the blade mount assembly 102a and the plates 123a of the supporting body holders 107a are of narrower design than those of the blade mount assembly 102 and the support assembly 107 of FIG. 1. Plates 121b of the blade mount assembly 102b and the plates 123b of the support assembly 107b are of wider design than those of the blade mount assembly 102 and the support assembly 107 of FIG. 1.

In order to adapt the device which is illustrated in FIG. 1 to a pipe cross section of different diameter, the connection bolts 111, 125 may be loosened and the blade mount assembly 102 and the support assembly 107 may be interchanged for the blade mount assembly 102a or 102b and the support assembly 107a or 107b. As a result, the device is suitable for splitting pipes of smaller diameter (102a, 107a) or larger diameter (102b, 107b).

Consistent with a further aspect of the present invention, the blade position is interchangeable and adaptable. Moreover, main body 100 and a blade 103 and/or 105 have a modular design, which may selectively secured to the main body 100. The blade 103, 105 may be selectively secured to main body 100 either via blade mount assembly 102, or directly via main holder 10 (as depicted FIG. 10). The blade 103,105 or the blade mount assembly may optionally be selectively secured to the main body 100 via main holder 10 at connecting points of varying distances from the longitudinal axis 127 of the main body 100, with the result that a cutting point of the blade can be offset radially with respect to the longitudinal axis 127 of the main body 100 when the need arises.

Figure 7:
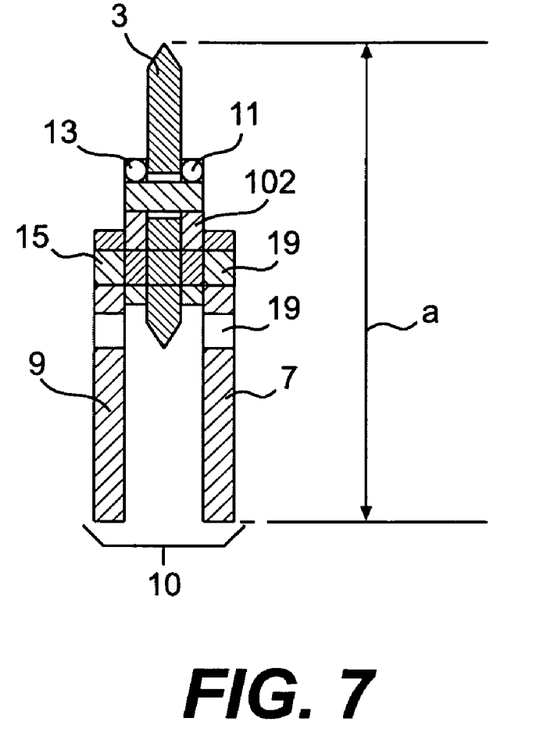
FIG. 7 shows, in an enlarged sectional illustration, a blade, a blade mount assembly and a main body of a device according to the invention in a first fitted state.
Figure 8:
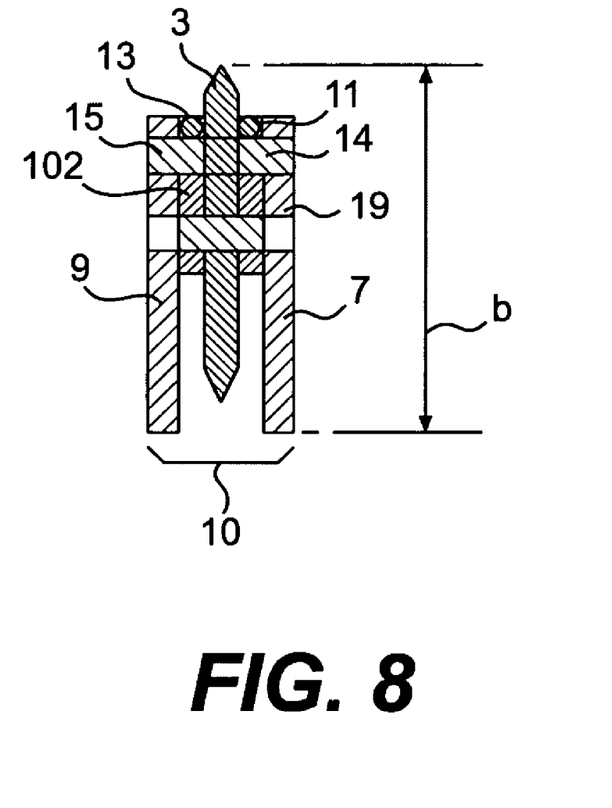
FIG. 8 shows, in an enlarged sectional illustration, a blade, a blade mount assembly and a main body of a device according to the invention in a further fitted position.
Figure 9:
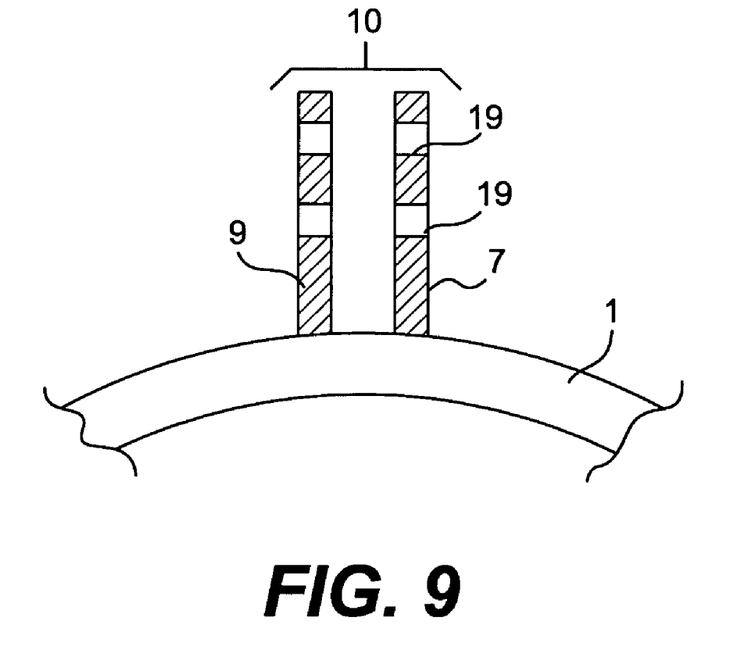
FIG. 9 shows, in a cross-sectional view, the main body and a main holder.

Consistent with a further aspect of the invention depicted in FIG. 9, main body 1 may include at least one main holder 10, which comprises plates 7, 9 welded to main body 1. Main holder 10 may include at least one pair of recesses 19 configured to engage connection bolt 15 in order to selectively secure blade 3 (FIGS. 10, 11) or blade mount assembly 102 (FIGS. 7, 8). By providing a plurality of recesses 19 set at different distances from the longitudinal axis of main body 1, blade 3 may be selectively secured at varying distances from the main body 1.

To split the pipe, the main body 100 may be pushed into the pipe, whereby the main body may, for example, be cylindrical and also have eccentricities. The main body 100 may be designed as a carriage or as a linkage attachment. In particular, the main body 100 may also be designed as an attachment for a conductor linkage. As an alternative, the main body 100 may have a shape which engages around the pipe from the outside.

The blade 105 has a suitable cutting edge 127 for ripping open pipes. In this case, the blade 105 may have a rising cutting edge or a cutting edge tapering to a point. The blade 105 may be designed as a hooked cutter. Blade 105 is preferably designed as a radial blade, as depicted in FIG. 1, which is preferably mounted rotatably.

In an exemplary embodiment, the main body 100 and blade mount assembly 102 are coordinated with each other in such a manner that the blade mount assembly 102, in the fitted state, is supported on the main body 100. The blade mount assembly 102 can thus conduct the forces, which are directed radially toward the main body 100 during cutting, into the main body 100 without loading the connection between the blade mount assembly 102 and main body 100.

The blades 103, 105 may be held in a fixed or rotatable manner in a blade mount assembly. The blade mount assembly 102 makes the handling of the blade 103, 105 easier and can prevent injuries when adjusting the blade position.

Figure 10:
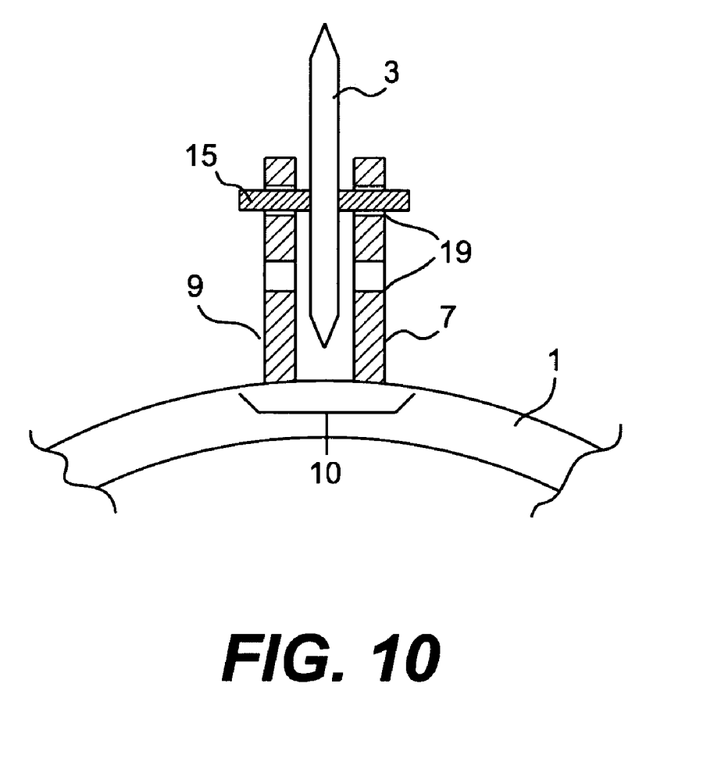
FIG. 10 shows, in a cross-sectional view, the main body and a main holder carrying a blade in a first position.

Attentively, blades 103, 105 may be held in a fixed or rotatable manner between plates 7, 9 of main holder 10, as depicted in FIG. 10.

In a further embodiment, a plurality of blades 103, 105 are held in the blade mount assembly. 102, with the result that a simple, simultaneous handling of multiple blades 103, 105 is possible. Main holder 10 may also be adapted to hold a plurality of blades 103, 105. The blades 103, 105 may, in particular, differ in size. In the case of radial blades as depicted in FIG. 1, these blades 103, 105 may have a different radius. In the case of cutters having a linear cutting edge, the height of the cutter, i.e. the distance of the cutting edge from opposite base line, may differ in size.

In another embodiment, the blade mount assembly 102, in the fitted state, is oriented parallel to the longitudinal axis 127 of the main body 100 and has a slope 117 at least at one end. The slope 117 facilitates the introduction of the device composed of the blade mount assembly 102 and the main body 100 into a pipe.

Figure 4:
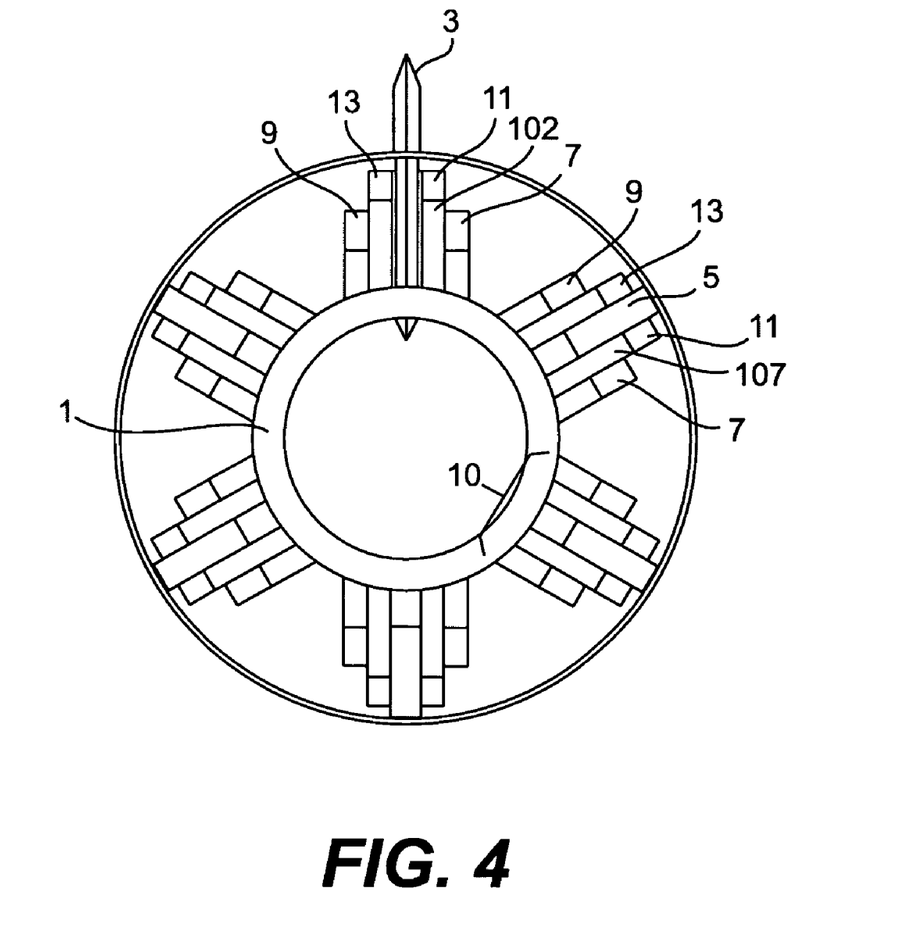
FIG. 4 shows, in a sectional view, a device according to the invention in a first pipe.

FIG. 4 shows a main body 1, a blade 3 and five support bodies 5. Main holders 10 comprising plates 7, 9 are welded to the main body 1. Firstly, the blade mount assembly 102, which likewise includes plates 11, 13, and the support assembly 107, which likewise comprise plates 11, 13, may be held in these main holders 10. In order to reduce the storage costs and to increase the flexibility with which blades 3 or support bodies 5 can optionally be fastened to a specified main body 1, the main holder 10 (plate 7, 9) both for blade mount assemblies and for support assemblies may be of identical design. Similarly, the plates 11,13 of the blade mount assembly and those of the support assembly may be identical.

Figure 6:
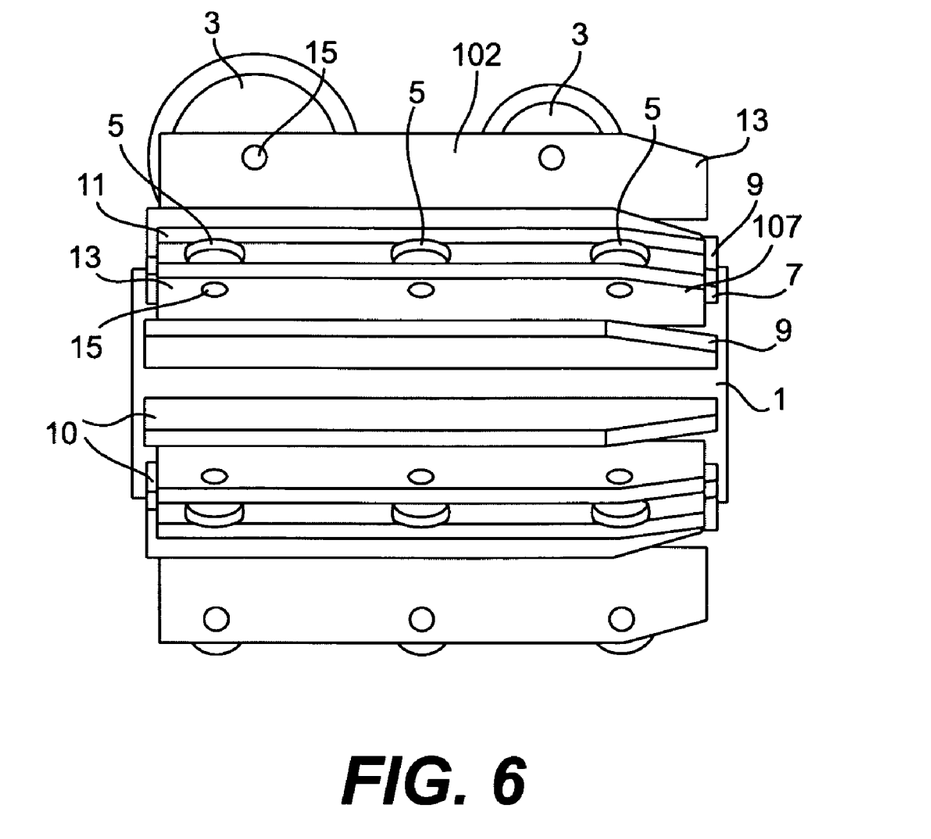
FIG. 6 shows, in a schematic, perspective view, the device according to the invention.

As can be seen from FIG. 6, two blades 3 are held in the blade mount assembly 102. Three supporting bodies 5 are held between the plates 11 and 13 in a support assembly 107. The blades 3 and the support bodies 5 are held in the blade mount assembly 102 and in the support assembly 107, respectively, via connecting bolts 15. Each of the blade mount assembly 102 and support assembly 107 are held between plates 7, 9 of main holders 10.

Consistent with a further aspect of the present invention, a blade mount connecting bolt 125 is provided which engages in complementary recesses of the blade assembly 102 and the main holder 10. At least two recesses, which may be offset radially with respect to the longitudinal axis 127 of the main body 100 and in which the blade mount connecting bolt 125 optionally engages in the fitted state, can be provided on the blade 103, on the blade mount assembly 102, and/or on the main holder 10. This creates a connection of the blade 105 and the blade mount assembly 102 to the main holder 10 which is simple to produce and permits an easy changing of the blade position with respect to the main body 100. This arrangement further provides a stable connection of the blade 103 to the main body 100. Attentively, as depicted in FIG. 10, plates 7, 9 of main holder 10 include recesses 19 offset radially from one another in direction away from the longitudinal axis of the main body.

The recesses provided in the blade 103, the blade mount assembly 102, main body 100, and main holder 10 may be, for example, threaded holes, bolt abutments, holes or slotted guide mechanisms. The recesses may be offset radially in a plane perpendicular with respect to the longitudinal axis of the main body. Similarly, the connecting positions may be offset axially to one another with respect to the longitudinal axis of the main body. Instead of a bolt engaging in a recess of the main holder, a projection which is formed on the main holder 100 and, in the fitted state, engages optionally in one of at least two recesses of the blade 103 may also be provided according to the invention. Similarly, instead of a bolt engaging in a recess of the blade 103, a projection may be provided which is formed on the blade 103 and, in the fitted state, optionally engages in one of at least two recesses of the blade mount assembly 102.

The blade mount connecting bolt 125 may be a cylindrical bolt which is guided through connections, such as bore-holes, in the blade mount assembly 102 and through a bore-hole in the blade 103. In the case of a blade 103 designed as a cutter disk, the blade mount connecting bolt 125 bolt can be guided through the center of the cutter disk and can serve as the axis of rotation of the cutter. As an alternative or in addition, the blade mount connection bolt 125 may be guided through coaxially aligned bore-holes in the blade mount assembly 102 and main body 100. As a further alternative depicted in FIGS. 10 and 11, blade may be directly mounted to main body 1 via main holder 10. Connection bolt 15 may secure blade 3 between plates 7, 9 of main holder 10. Connection bolt 15 may be secure blade 3 to any pair of recesses 19 in plates 7, 9. However, blade mount connecting bolts 125 and connection bolts 15 are also understood to be other plug-in bodies, for example wedges or pins having trapezoidal cross sections.

The blade 103 may be connected to the main body 100 via blade mount assembly 102 by a plurality of blade mount connecting bolts 125. This enables the introduction of force into the main body 100 to be improved. In addition, a plurality of blade mount connecting bolts 125 prevent, for example, the rotation of the blade mount assembly 102 about a first bolt connection, with the result that the blade 103 is held in a clearly defined position with respect to the main body 100. Likewise, blade 3 may be connected to main holder 10 by a plurality of connecting bolts 15, as depicted in FIG. 10.

According to the invention, the device may also implement supporting bodies 109 of a device for splitting up pipes with, for example, a fixed blade 103. These supporting bodies 109 may be arranged in the region of a blade 103, preferably lying opposite the cutter with respect to the longitudinal axis 127 of the main body 100. The above embodiments with respect to the blade 103 and the blade mount assembly 102 of the device according to the invention are therefore also to be understood as embodiments with respect of a supporting body 109 and a support assembly 107. The suitability of the above-described device for splitting up pipes of different pipe diameter can thus also readily be achieved in such a manner that the relative position of the blade 103 with respect to the main body 100 remains unchanged and the position of the supporting body is changed, by using support assemblies of varying length. The main body 100 may be, for example, held eccentrically in the pipe which is to be split up. As an alternative, for example, both the supporting bodies 109 and the blade 103 may be adjusted in their position relative to the main body.

In one embodiment, the supporting body 109 may be a roller body, for example a roller cylinder.

As can be seen in FIGS. 7 and 8, the blade 3 may be held asymmetrically in the blade mount assembly 102. This makes it possible, by releasing the blade mount assembly 102, rotating the blade mount assembly 102 through 180E and refastening the blade mount assembly 102, to reduce the distance of the outermost cutting point from the distance a to the distance b. An adaptation of the device according to the invention to a different cross section of the pipe which is to be split can thus take place in a simple manner. The asymmetric arrangement permits a different arrangement of the blade 3 relative to the main body 100 by simple rotation of the blade mount assembly 102 through 180E.

Figure 11:
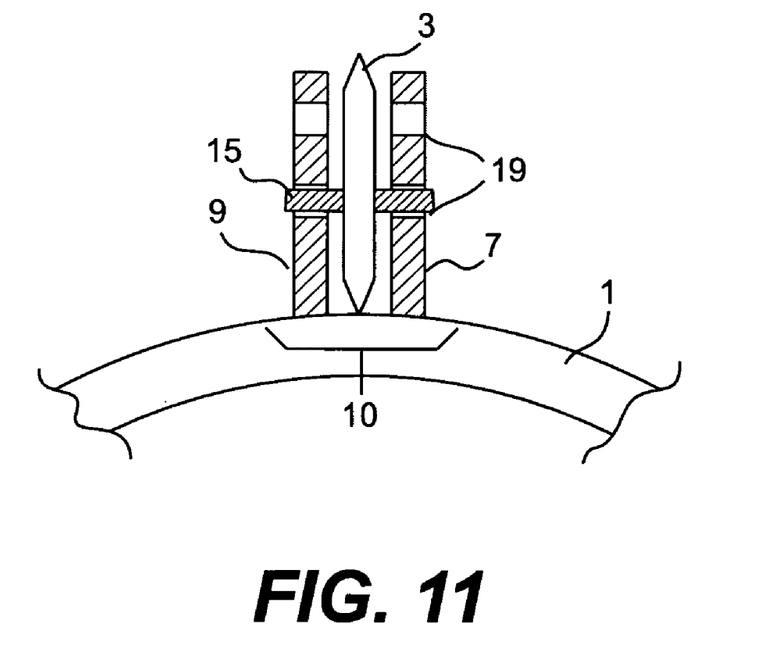
FIG. 11 shows, in a cross-sectional view, the main body and a main holder carrying a blade in a second position.

FIG. 7 further shows that the blade mount assembly 102 has a plurality of radially spaced apart recesses (holes) 19 for the blade mount connection bolt 15. Releasing the blade mount connection bolt 15 and refastening it in another recess therefore enables the device according to the invention to be adapted likewise in a simple manner to a different pipe diameter of the pipe which is to be split. Likewise, FIGS. 10 and 11 show that main holder 10 includes a plurality of radially spaced apart recesses 19 for the blade connection bolt 15, thereby allowing blade 3 to be mounted at varying distance from the longitudinal axis of the main body 1.

The method according to the invention for splitting pipes provides for the blade 3 to be connected to the main body 100 at one of the recesses 19 which are offset radially with respect to the longitudinal axis 127 of the main body 100. Securing the bolt in a second recess 19 may place the cutting point of the blade 103 at a greater distance from an opposite supporting point than the inside diameter of the pipe which is to be split.

As an alternative or in addition, the method according to the invention for splitting pipes provides for the supporting body 109 to be connected to the main body 100 at one of the recesses 19 which are offset radially with respect to the longitudinal axis 127 of the main body 100. Securing the bolt in a second recess may place the cutting point of the blade 103 at a greater distance with respect to the center point of the smallest enveloping circle, which runs tangentially through the cutting point of the blade 103 and a supporting point of the supporting body 109, than the inside radius of the pipe which is to be split up.

Figure 5:
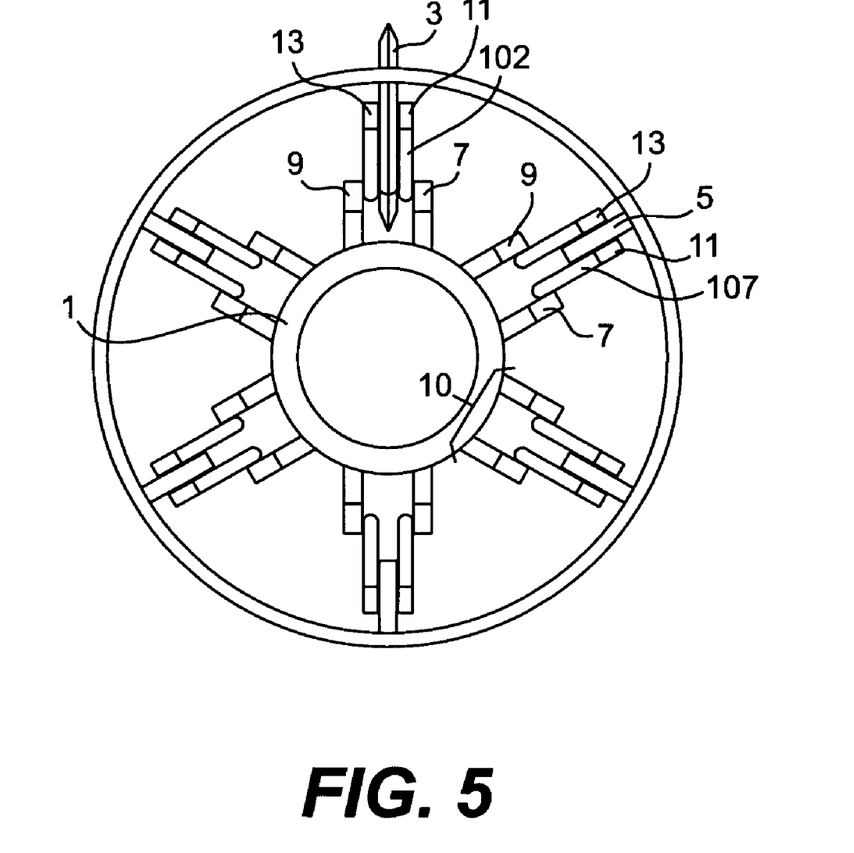
FIG. 5 shows, in a sectional view, the device according to the invention from FIG. 1 in a second pipe.

FIG. 5 shows, in a comparison with FIG. 4, that both the position of the blade mount assembly 102 and the position of the support assembly 107 may be adapted. A splitting up of a pipe provided with a larger pipe diameter in relation to the pipe illustrated in FIG. 4 is therefore readily possible.

In addition, at least two blades 103, 105 which differ in size and which can optionally be fitted in a main holder of the main body 100 can be provided for greater flexibility. FIGS. 9–11 depict main holder 10. Main holder 10 may comprise plates 7, 9 that may be rigidly attached, such as by welding, to main body 1. Main holder 10 may include multiple recess 19 in plates 7, 9. Recesses 19 are offset radially from one another in a direction away from the longitudinal axis of main body 1. Blade 3 may be selectively secured between plates 7, 9 of main holder 10 via connection bolt 15 and a first recess 19. The radial distance between the blade 3 and the longitudinal axis of main body 1 may be adjusted by inserting connection bolt 15 through a second recess 19.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system configured to cut a pipe, the system comprising:
    a main body having a longitudinal axis and a mounting location;
    a blade; and
    first and second blade mount assemblies having an upper surface and a lower surface, the first and second blade mount assemblies being exchangeable among each other so that either the first or the second blade mount assembly is attached to the main body at the mounting location, the first blade mount assembly being configured to selectively secure the blade at a first distance from the longitudinal axis of the main body, and the second blade mount assembly being configured to selectively secure the blade at a second distance from the longitudinal axis of the main body, the first distance being different from the second distance when the first blade mount assembly is attached to the main body at the same mounting location and in the same manner as the second blade mount assembly.

2. The system of claim 1, wherein one of the first and second blade mount assemblies is supported on the main body.

3. The system of claim 1, wherein at least one of the first and second blade mount assemblies is configured to selectively secure at least one additional blade.

4. The system of claim 3, wherein the at least one additional blade differs in size from the blade.

5. The system as in any one of claims 1–4, wherein the first or second blade mount assembly, when attached to the main body, is oriented in a direction substantially parallel to the longitudinal axis of the main body.

6. The system as in any one of claims 1–4, the first and second blade mount assemblies having longitudinal ends, wherein at least one of the first and second blade mount assemblies further comprises a sloping surface at least one longitudinal end.

7. The system as in any one of claims 1–4, wherein the blade is asymmetrically mounted on the first or second blade mount assemblies such that the blade extends a first distance beyond the upper surface of the blade mount assembly and a second distance beyond the lower surface of the blade mount assembly, the first distance being different than the second distance.

8. A system for splitting a pipe, the system comprising:
    a main body having a longitudinal axis and a main holder;
    a first blade and a second blade, the first blade being of a different size than the second blade; and
    the main holder being rigidly fixed to the main body and configured to secure either the first blade or the second blade, wherein the first blade and the second blade further comprise a blade bore-hole, and the main holder further comprises a recess, the system further comprising a blade connecting bolt selectively securing the first blade or the second blade to the main holder, the blade connecting bolt engaging the coaxially aligned blade bore-hole and the recess.

9. A system for splitting a pipe, the system comprising:
    a main body having a longitudinal axis and a main holder;
    a first blade and a second blade, the first blade being of a different size than the second blade; and
    the main holder being rigidly fixed to the main body and configured to secure either the first blade or the second blade, wherein the first blade and the second blade further comprise a blade bore-hole, and the main holder further comprises first and second recesses located at a first and second connection points, respectively, the system further comprising a blade connecting bolt selectively securing the first blade or the second blade to the main body, the blade connecting bolt selectively engaging the coaxially aligned blade bore-hole and the first recess at the first connection point, or the blade connection bolt selectively engaging the coaxially aligned blade bore-hole and second recess at the second connection point.

10. A system for splitting a pipe, the system comprising:
a main body having a longitudinal axis and a main holder;
a first blade and a second blade, the first blade being of a different size than the second blade;
the main holder being rigidly fixed to the main body and configured to secure either the first blade or the second blade; and
a support assembly having an upper surface and a lower surface and being configured to selectively secure a support body, the support assembly being selectively secured to the main holder at one of a first and second support connection points, the second support connection point being offset radially from the first support connection point in a direction away from the longitudinal axis of the main body.

11. The system of claim 10, wherein the support body is a roller.

12. The system of claim 10, wherein the support body further comprises a support body connection, and the support assembly further comprises a support assembly connection, the device further comprising a support body connecting bolt selectively securing the support body to the support assembly, the support body connecting bolt engaging the support body connection and support assembly connection.

13. The system of claim 10, wherein the support assembly further comprises a support mount connection, and the main holder further comprises first and second main holder connections located at the first and second support connection points, respectively, the device further comprising a support assembly connecting bolt selectively securing the support assembly to the main holder, the support assembly connecting bolt selectively engaging the support assembly connection and first main holder connection, or the support assembly connecting bolt selectively engaging the second body mount connection and support assembly body connection.

14. A system for splitting a pipe, the system comprising:
a main body having a longitudinal axis and a main holder;
a first blade and a second blade, the first blade being of a different size than the second blade;
the main holder being rigidly fixed to the main body and configured to secure either the first blade or the second blade; and
a support assembly having an upper surface and a lower surface and being configured to selectively secure a support body, the support assembly being securely attached to the main body.

15. A device for splitting a pipe, the device comprising:
a main body having a longitudinal axis, the main body having a first connecting point and a second connecting point, wherein the second connecting point is radially offset from the first connecting point in a direction away from the longitudinal axis of the main body;
a blade; and
a blade mount assembly having an upper surface and a lower surface and being configured to selectively secure the blade, the blade mount assembly being selectively secured to the main body at one of a the first or second connection points and configured to secure the blade within an interior of the pipe.

16. The device of claim 15, wherein the blade further comprises a blade bore-hole, and the blade mount assembly further comprises a blade mount connection, the device further comprising a blade connecting bolt selectively securing the blade to the blade mount assembly, the blade connecting bolt engaging the blade bore-hole and blade mount connection.

17. The device of claim 15, wherein the blade mount assembly further comprises a body mount connection, and the main body further comprises first and second main body connections located at the first and second connection points, respectively, the device further comprising a blade mount connecting bolt selectively securing the blade mount assembly to the main body, the blade mount connecting bolt selectively engaging the body mount connection and first main body connection at the first connection point, or the blade mount connecting bolt selectively engaging the coaxially aligned body mount connection and second main body connection at the second connection point.

18. The device as in any one of claims 15–17, wherein the blade is asymmetrically mounted on the blade mount assembly such that the blade extends a first distance beyond the upper surface of the blade mount assembly and a second distance beyond the lower surface of the blade mount assembly, the first distance being different than the second distance.

19. The device of claim 15, the device further comprising:
a support assembly having an upper surface and a lower surface and being configured to selectively secure a support body, the support assembly being selectively secured to the main body at one of a first and second support connection points, the second support connection point being offset radially from the first support connection point in a direction away from the longitudinal axis of the main body.

20. The device of claim 19, wherein the support body is a roller.

21. The device of claim 19, wherein the support body further comprises a support body connection, and the support assembly further comprises a support assembly connection, the device further comprising a support body connecting bolt selectively securing the support body to the support assembly, the support body connecting bolt engaging the support body connection and support assembly connection.

22. The device of claim 19, wherein the support assembly further comprises a support mount connection, and the main body further comprises first and second main body connections located at the first and second support connection points, respectively, the device further comprising a support assembly connecting bolt selectively securing the support assembly to the main body, the support assembly connecting bolt selectively engaging the support assembly connection and first main body connection, or the support assembly connecting bolt selectively engaging the second body mount connection and support assembly body connection.

23. The device of claim 15, the device further comprising:
a support assembly having an upper surface and a lower surface and being configured to selectively secure a support body, the support assembly being securely attached to the main body.

24. The device of claim 23, wherein the support body is a roller.

25. The device of claim 15, wherein each of the first and second connection points further comprises a flange projecting from the main body that selectively engages a corresponding recess in the blade mount assembly.

26. The device of claim 15, wherein each of the first and second connection points further comprise a recess in the main body that selectively engages a corresponding flange projecting from the blade mount assembly.

27. A method for splitting a pipe with the device of claim 16, the pipe having an inside diameter, the method comprising:

selectively securing the blade to the blade mount assembly;

selectively securing the support body to the support assembly;

selectively securing the support assembly to the main body at a first position such that the support assembly is opposite the blade mount assembly with respect to the longitudinal axis of the main body;

selectively securing the blade mount assembly to the main body at a first position such that a cutting point of the blade is at a greater distance from an opposite support body than the inside diameter of the pipe; and applying sufficient pressure to the main body in a longitudinal direction to split the pipe.

28. A device for splitting a pipe, the device comprising:
a main body having a longitudinal axis and a main holder, the main body having a first connecting point and a second connecting point, wherein the second connecting point is radially offset from the first connecting point in a direction away from the longitudinal axis of the main body;
a blade; and
a blade mount assembly having an upper surface and a lower surface and being configured to selectively secure the blade at a connection point, the blade mount assembly being selectively secured to the main holder at one of the first or second connection points.

29. The device of claim 28, wherein the blade further comprises a blade bore-hole, and the blade mount assembly further comprises a blade mount connection, the device further comprising a blade connecting bolt selectively securing the blade to the blade mount assembly, the blade connecting bolt engaging the blade bore-hole and blade mount connection.

30. The device of claim 28, wherein the blade mount assembly further comprises a body mount connection, and the main holder further comprises first and second main holder connections located at the first and second connection points, respectively, the device further comprising a blade mount connecting bolt selectively securing the blade mount assembly to the main holder, the blade mount connecting bolt selectively engaging the coaxially aligned body mount connection and first main holder connection at the first connection point, or the blade mount connecting bolt selectively engaging the coaxially aligned body mount connection and second main holder connection at the second connection point.

31. The device of claim 28, the device further comprising:
a support assembly having an upper surface and a lower surface and being configured to selectively secure a support body, the support assembly being selectively secured to the main holder at one of a first and second support connection points, the second support connection point being offset radially from the first support connection point in a direction away from the longitudinal axis of the main body.

32. The device of claim 31, wherein the support body is a roller.

33. The device of claim 31, wherein the support body further comprises a support body connection, and the support assembly further comprises a support assembly connection, the device further comprising a support body connecting bolt selectively securing the support body to the support assembly, the support body connecting bolt engaging the support body connection and support assembly connection.

34. The device of claim 31, wherein the support assembly further comprises a support mount connection, and the main holder further comprises first main holder connection and second main holder connections located at the first and second support connection points, respectively, the device further comprising a support assembly connecting bolt selectively securing the support assembly to the main holder, the support assembly connecting bolt selectively engaging the support assembly connection and first main holder connection, or the support assembly connecting bolt selectively engaging the second body mount connection and support assembly body connection.

35. The device of claim 28, the device further comprising:
a support assembly having an upper surface and a lower surface and being configured to selectively secure a support body, the support assembly being securely attached to the main body.

36. A device for splitting a pipe, the device comprising:
a main body having a longitudinal axis and a main holder, the main body having a first blade connection point and a second blade connection point;
a blade; and
a blade mount assembly having an upper surface and a lower surface and being configured to selectively secure the blade at one of the first or second blade connection points, the second blade connection point being offset radially from the first blade connection point in a direction away from the longitudinal axis of the main body, in such a manner that the blade can only be held either at the first blade connection point or the second blade connection point, the blade mount assembly being selectively secured to the main holder at a connection point.

37. The device of claim 36, wherein the blade mount assembly further comprises a blade mount connection, and the main holder further comprises a main holder connection, the device further comprising a blade mount connecting bolt selectively securing the blade mount assembly to the main holder, the blade mount connecting bolt engaging the coaxially aligned blade mount connection and main holder connection.

38. The device of claim 36, wherein the blade further comprises a blade bore-hole, and the blade mount assembly further comprises first and second blade mount connections located at the first and second connection points, respectively, the device further comprising a blade connecting bolt selectively securing the blade to the blade mount assembly, the blade connecting bolt selectively engaging the coaxially aligned blade connection and first blade mount connection at the first connection point, or the blade connecting bolt selectively engaging the coaxially aligned blade connection and second blade mount connection at the second connection point.

39. The device of claim 36, the device further comprising:
a support assembly having an upper surface and a lower surface and being configured to selectively secure a support body, the support assembly being selectively secured to the main holder at one of a first and second support connection points, the second support connection point being offset radially from the first support connection point in a direction away from the longitudinal axis of the main body.

40. The device of claim 39, wherein the support body is a roller.

41. The device of claim 39, wherein the support body further comprises a support body connection, and the support assembly further comprises a support assembly connection, the device further comprising a support body connecting bolt selectively securing the support body to the support assembly, the support body connecting bolt engaging the support body connection and support assembly connection.

42. The device of claim 39, wherein the support assembly further comprises a support mount connection, and the main holder further comprises first and second main holder connections located at the first and second support connection points, respectively, the device further comprising a support assembly connecting bolt selectively securing the support assembly to the main holder, the support assembly connecting bolt selectively engaging the support assembly connection and first main holder connection, or the support assembly connecting bolt selectively engaging the second body mount connection and support assembly body connection.

43. The device of claim 36, the device further comprising:
 a support assembly having an upper surface and a lower surface and being configured to selectively secure a support body, the support assembly being securely attached to the main body.

44. A device for splitting a pipe, the device comprising:
 a main body having a longitudinal axis and a main holder;
 a blade; and
 a blade mount assembly having an upper surface and a lower surface and being configured to selectively secure the blade, the blade mount assembly being selectively secured to the main holder in one of a first or second position the blade being asymmetrically mounted on the blade mount assembly such that the blade extends a first distance in a direction away from the main body when the blade mount assembly is selectively secured in the first position, and a second distance in a direction away from the main body when the blade mount assembly is selectively secured in the second position, the first distance being different than the second distance.

* * * * *